June 20, 1939. W. W. HAASE 2,163,173
UNIVERSAL BURIAL DEVICE
Filed Oct. 10, 1936 8 Sheets-Sheet 1

Inventor
Wilbert W. Haase.
By: Raymond W. Schnoor
Atty.

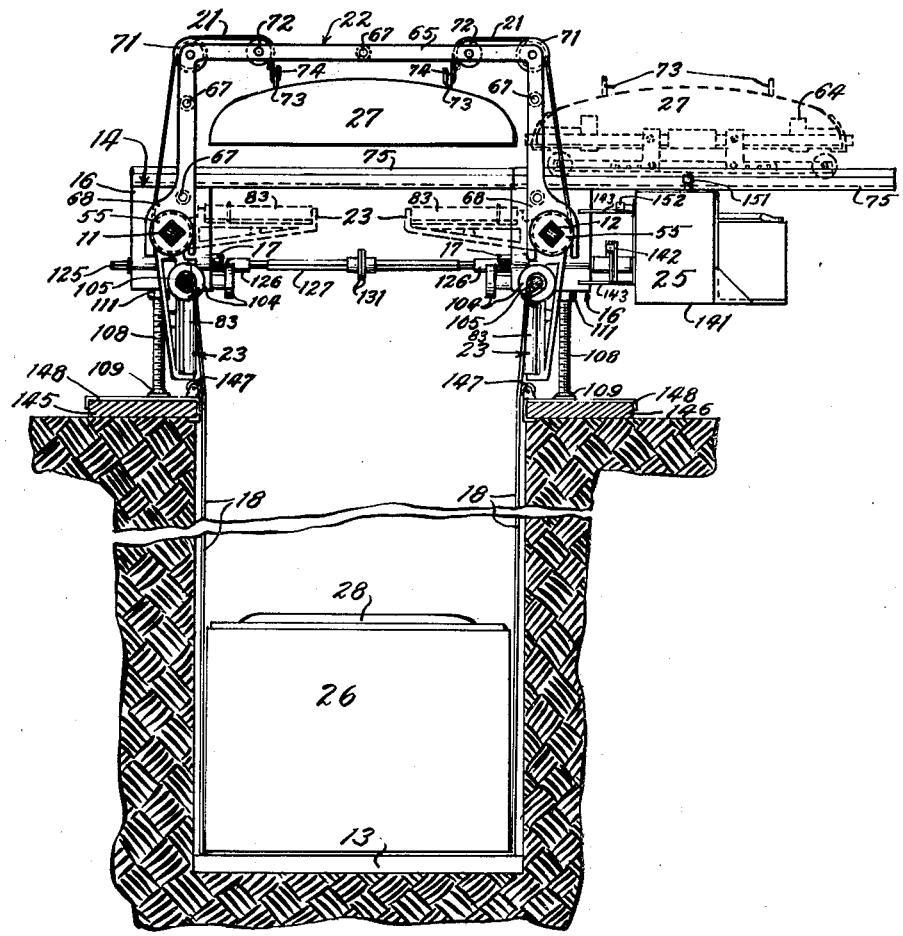

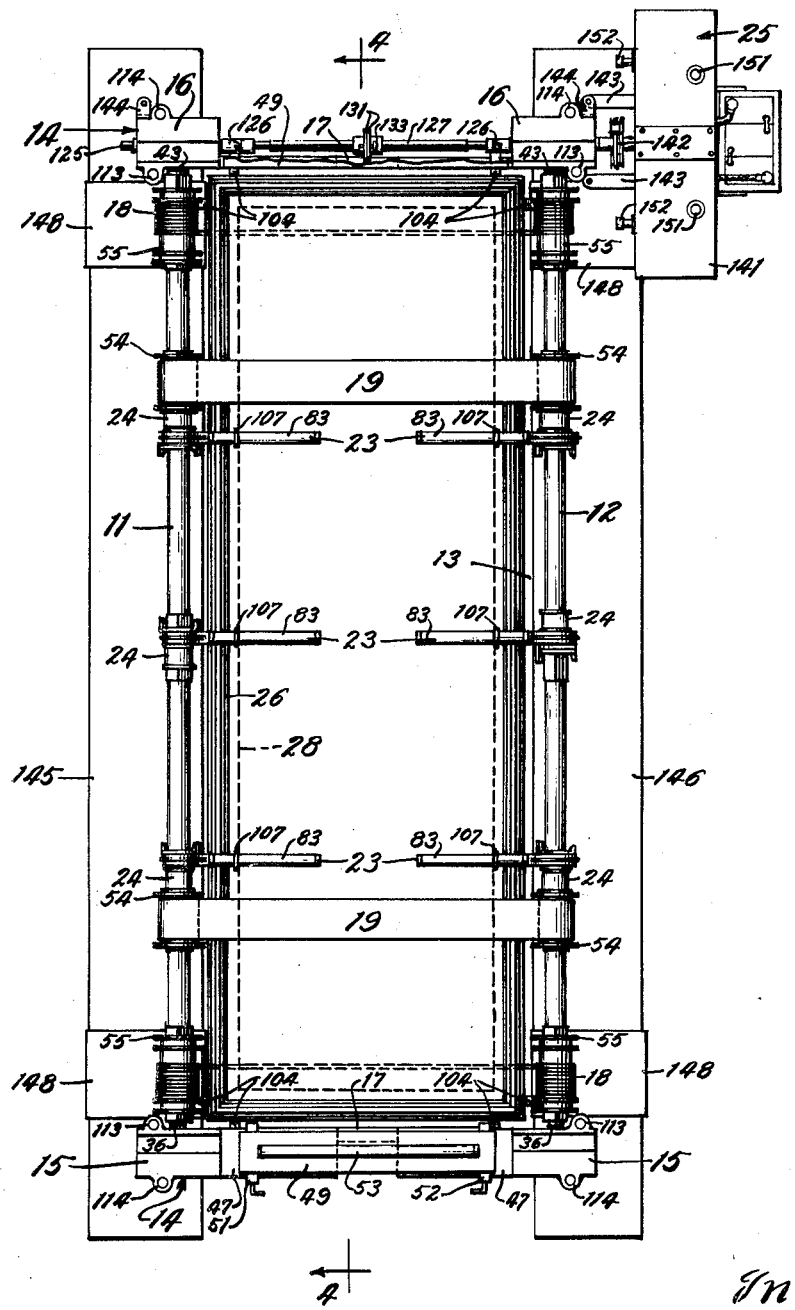

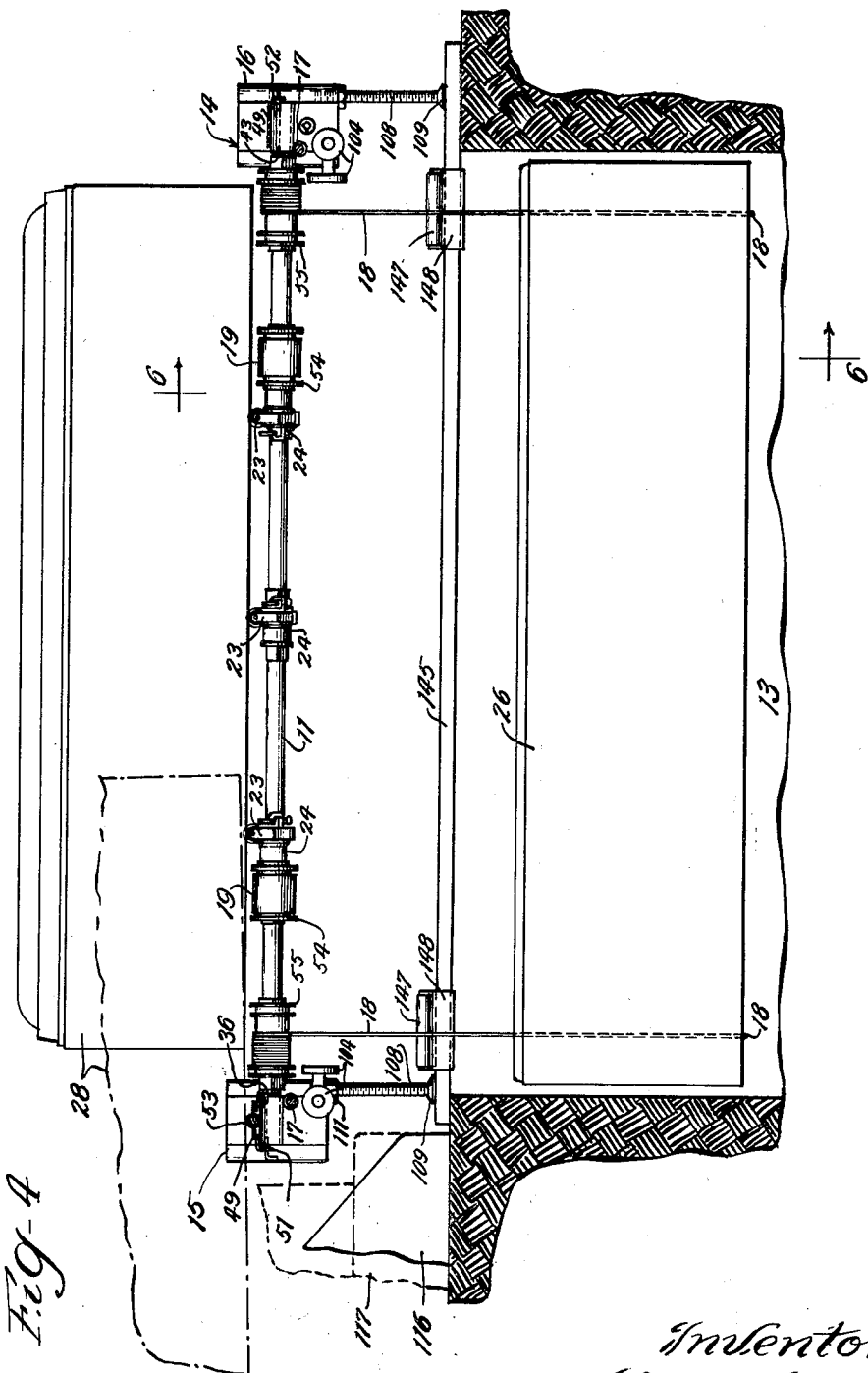

June 20, 1939.  W. W. HAASE  2,163,173
UNIVERSAL BURIAL DEVICE
Filed Oct. 10, 1936  8 Sheets-Sheet 5
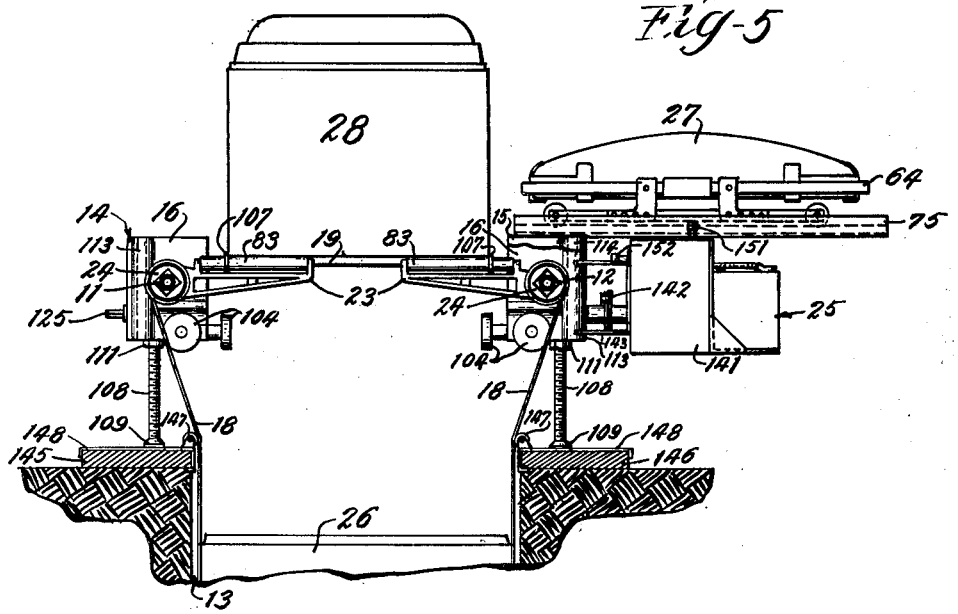
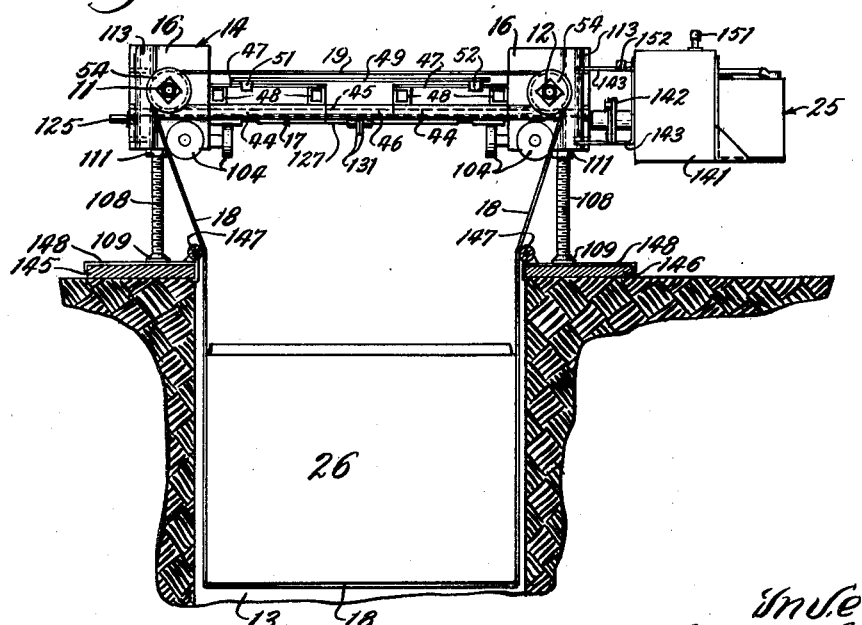
Inventor
Wilbert W. Haase.
By: Raymond D. Schnoor
Atty.

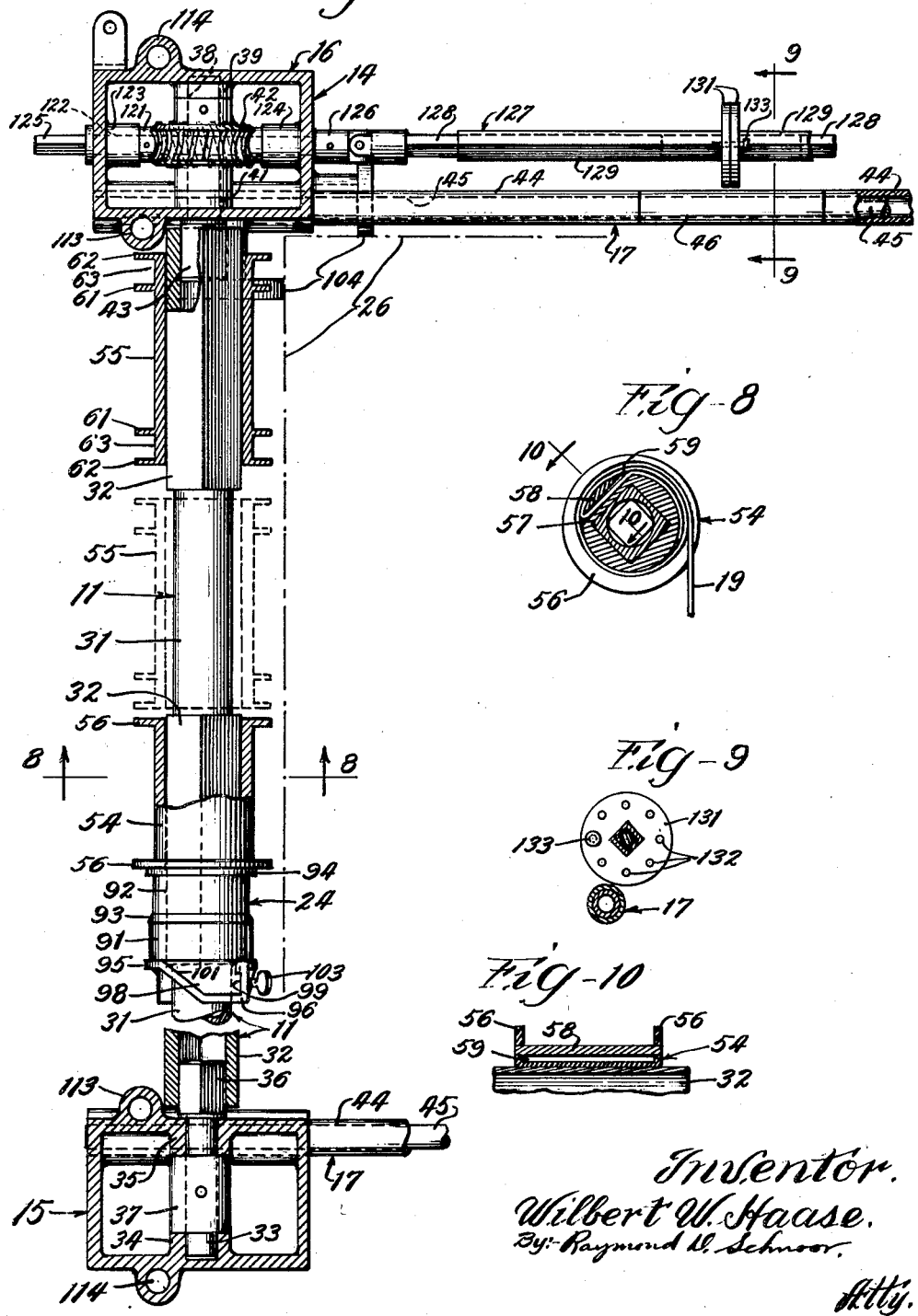

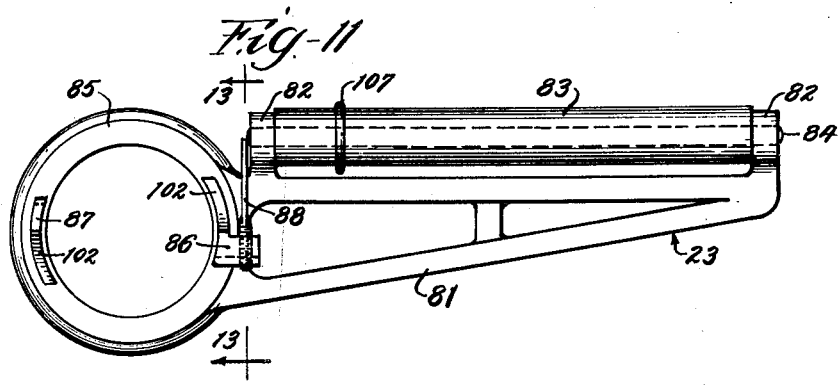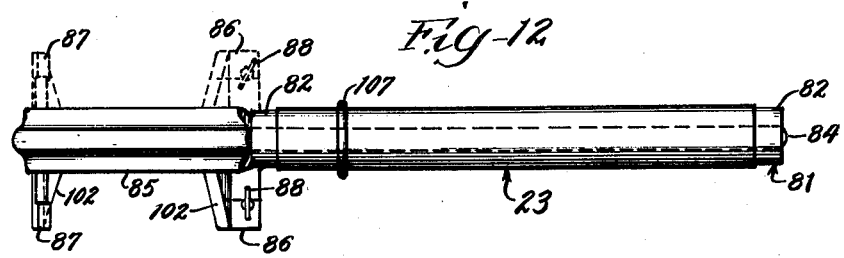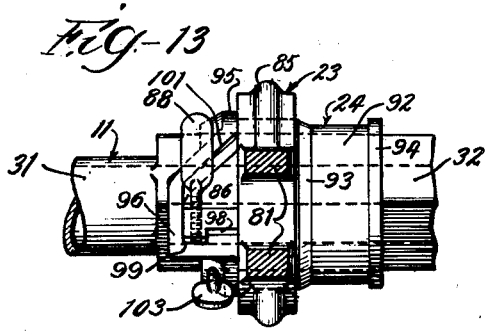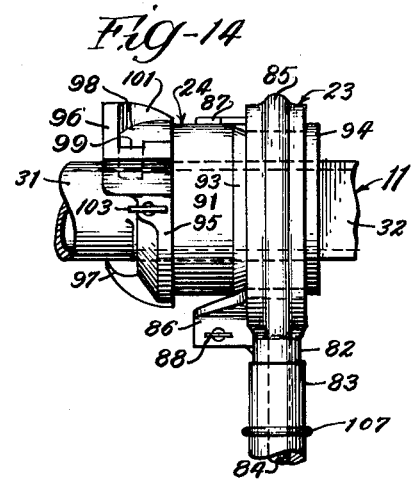

June 20, 1939. W. W. HAASE 2,163,173
UNIVERSAL BURIAL DEVICE
Filed Oct. 10, 1936 8 Sheets-Sheet 8
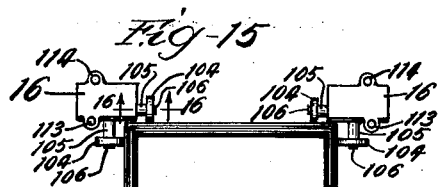
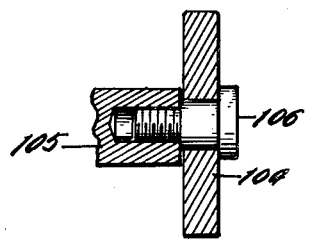
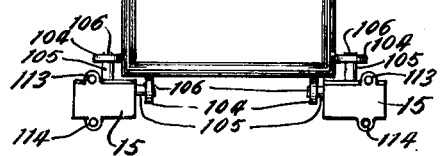
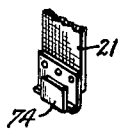
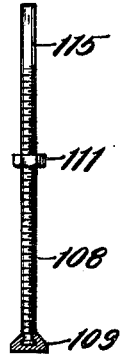
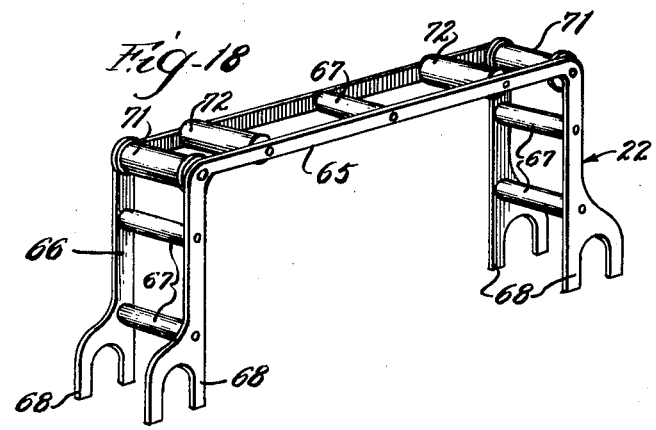
Inventor.
Wilbert W. Haase.
By: Raymond L. Schnoor.
Atty.

Patented June 20, 1939

2,163,173

UNITED STATES PATENT OFFICE 2,163,173

UNIVERSAL BURIAL DEVICE

Wilbert W. Haase, Forest Park, Ill., assignor to Wilbert W. Haase Co., Forest Park, Ill., a corporation of Illinois Application October 10, 1936, Serial No. 105,061

34 Claims. (Cl. 27—32)

This invention relates to a universal burial device and has for an important object the provision of such a device which may be adjusted to grave excavations of various dimensions and in accordance with surface irregularities at the opening thereof for supporting and lowering a burial vault therein and which may be operated to receive and deposit a casket into the burial vault, either while supporting the vault at or near the top of the excavation or near the bottom thereof in accordance with requirements, and to similarly assemble the cover of the burial vault thereto after a casket has been deposited therein.

Another important object of the invention is to provide such a device in which the weight of the casket is counter-balanced in a new and novel manner.

Other important objects of the invention, such as the construction and operation of the temporary support devices, the actuating and adjusting or leveling means, and the economical and efficient construction and arrangement of the parts will be apparent as the invention is better understood from the following description, which, taken in connection with the accompanying drawings, disclose a preferred embodiment thereof.

Referring to the drawings.

Figure 2 is an elevational section taken substantially on line 2—2, in Figure 1, illustrating details of construction and operation.

Figure 3 is a plan view similar to Figure 1, illustrating the device with parts removed and set up for operation under other conditions.

Figure 4 is a longitudinal elevational section taken substantially on line 4—4, in Figure 3, illustrating details of construction and operation.

Figure 5 is an end elevational view, viewing Figure 4 from the left, with certain parts broken away and omitted to illustrate details of construction.

Figure 6 is a transverse elevational section taken substantially on line 6—6, in Figure 4, illustrating the counter-balancing effect and details of construction.

Fig. 7 is an enlarged detail view of a rotatable lowering shaft and parts cooperating therewith for support and operation partly broken away to show details of construction.

Fig. 8 is a section taken substantially on line 8—8, in Fig. 7, illustrating construction and a method of connecting the flexible lowering elements.

Fig. 9 is a sectional view taken substantially on line 9—9, in Fig. 7, illustrating details of construction.

Fig. 10 is a sectional view taken substantially on line 10—10, in Fig. 8.

Fig. 11 is an enlarged detail view showing one of the temporary support arms in elevation.

Fig. 12 is a plan view of the arm shown in Fig. 11.

Fig. 13 is a sectional view taken substantially on line 13—13, in Fig. 11, and illustrating the arm mounted on a rotatable shaft through a sleeve.

Fig. 14 is a similar view showing the arm disengaged from the sleeve after substantially ninety degrees rotation.

Fig. 15 is a diagrammatic view illustrating the centering means.

Fig. 16 is a sectional view taken substantially on line 16—16, in Fig. 15, illustrating details of construction of the centering rollers.

Fig. 17 is an enlarged detail view illustrating details of construction of the adjustable legs.

Fig. 18 is a perspective view of the detachable belt guide, and;

Fig. 19 is an enlarged perspective view of one of the belt hooks.

Figure 1:
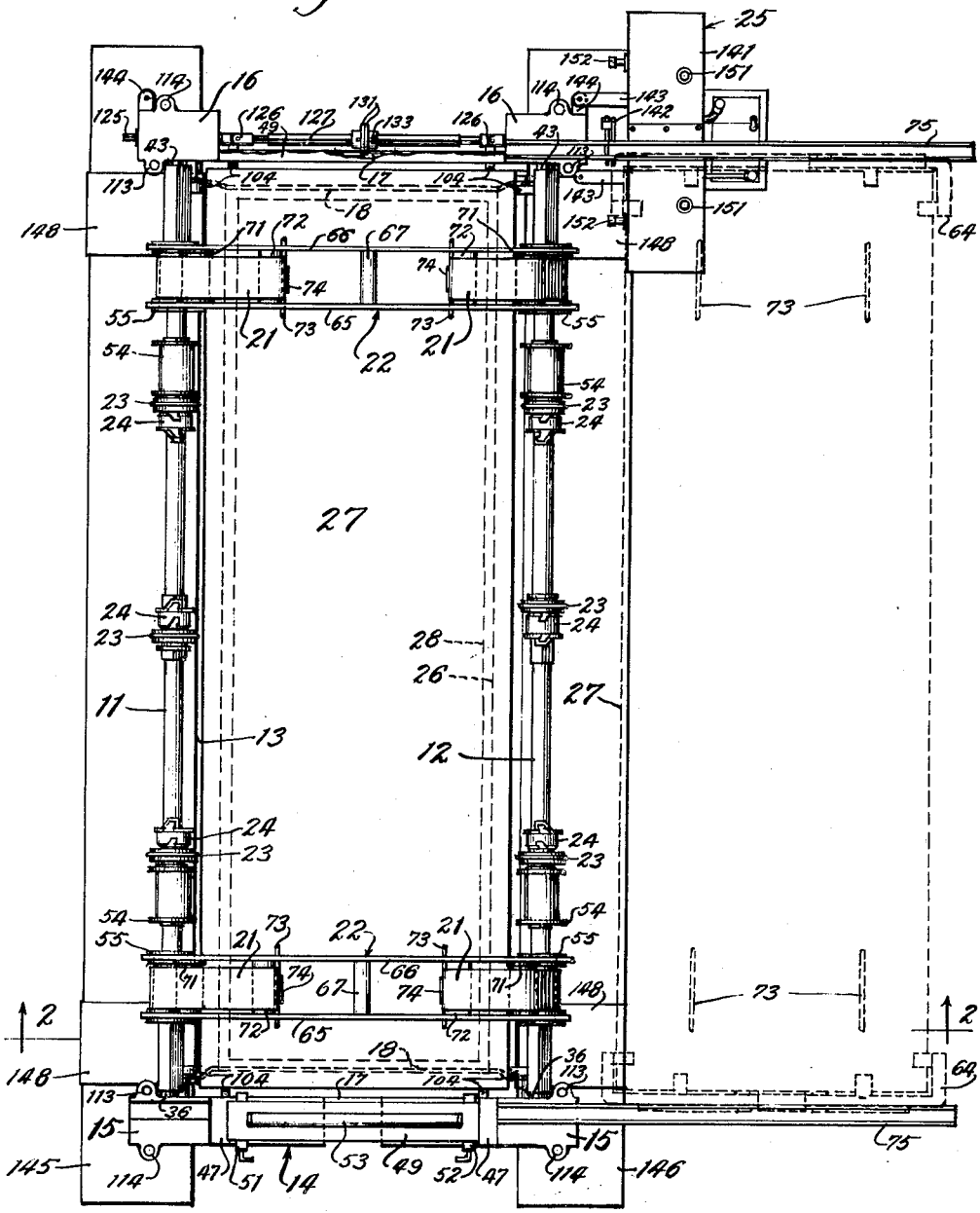
Figure 1 is a plan view of a device embodying my invention arranged in operative relationship over a grave excavation.

In order to illustrate the universal adaptability of the present embodiment of my invention I have shown the device (Figs. 1 and 2) arranged for the final operation of an internment, that of placing the cover on a vault, where, because of cemetery requirements or loose sandy soil which is subject to cave in, the burial vault is suspended or partly supported at or near the bottom of a grave excavation, and in (Figs. 3, 4, 5 and 6) it is shown arranged for normal operation, such as where the burial vault may be suspended at or near the top of a grave excavation and for performing the operations of raising and lowering the burial vault, for receiving a casket to be entered or deposited therein, for depositing the casket therein, and for the assembly of the cover of the vault thereto.

The device illustrated includes rotatable lowering shafts 11 and 12, arranged and supported over a grave excavation 13, by devices cooperating therewith to form a frame 14, including corner supports or pedestals 15 and 16, and spacing connectors 17, flexible elements 19, 20 and 21, a detachable guide frame 22 for guiding the flexible elements 21, temporary support arms 23, mounting sleeves 24 for the arms 23, and a power unit 25 operably connected to actuate the device.

To illustrate operation of the device I have shown a burial vault 26, a cover 27 therefor, and a casket 28, all of which may be of any commercial type.

The rotatable lowering shafts 11 and 12, (Figs. 1 to 7, inclusive) may be formed of any suitable relatively rigid shaft material and in the present embodiment these shafts are both formed of a substantially tubular material the exterior surface of which is divided longitudinally and provided with one or more protuberant portions to form alternately disposed round sections 31, and irregular or rectangular sections 32, arranged and spaced in accordance with requirements and for receiving devices which will be later described. The ends of the shafts 11 and 12 are socketed or formed to receive keyed ends of shafts extending from the pedestals 15 and 16.

The pedestals 15 are constructed to form journal bearings for rotatably supporting the shafts 11 and 12 and to accomplish this a shaft 33, is rotatably mounted in bearings 34 and 35, formed in the pedestals and a keyed or rectangular end 36, thereof extends from the pedestal for engaging an end of either the shaft 11 or 12. The keyed end 36 is preferably of sufficient length to permit of relative axial adjustment with respect to the shaft. A locating collar 37 which is suitably pinned or otherwise secured to the shaft 33 prevents axial movement thereof.

The pedestals 16 are similarly constructed to rotatably support drive shafts 38, rotatably mounted in bearings 39 and 41, formed in the pedestals 16. A worm gear 42 mounted on and suitably secured to the shaft 38 prevents axial movement and facilitates rotation thereof. A keyed or rectangular end 43 of the shaft 38 may be engaged in an end of either the shaft 11 or 12 to effect a support and drive connection therewith.

The shaft 11 having a pedestal or corner support 15 attached to one end thereof and a pedestal 16 attached to the other end thereof forms one side of the frame 14 and the opposite side thereof is formed by the shaft 12 having corner supports or pedestals 15 and 16 similarly attached thereto. The end members which complete the frame 14 are the spacing connectors 17. These connectors include tubular extensions 44, engaged in and extending from the pedestals 16 and an aligning bar or tube 45 positioned in and extending through the sleeves 44 and the pedestals 16. A spacing tube 46, which is similar to the tubes 44 is provided to extend the width of the frame 14 upon occasion.

The frame 14 is reinforced by plates 47, (Figs. 1, 4 and 6) mounted on spacers 48, through which the plates 47 are rigidly secured to the extensions 44 and to the pedestals 16, and a rest plate 49, having an extensible connection therewith through clamp brackets 51 and 52, attached to the plate 49 and engaging the plates 47. An antifriction roller 53, may be suitably mounted in one of the rest plates 49 (as shown) to provide an antifriction casket rest over which the casket may be moved onto the temporary support arms 23 (as indicated Fig. 4), wherein the casket 28 is shown in dotted lines resting on the roller 53 and directed onto the support arms 23 toward the position thereof shown in solid lines.

The flexible elements 18 are preferably strands of metal cable and the flexible elements 19 and 21 are preferably relatively wide strips of fabric.

Winding spools 54 and 55, (Figs. 7, 8 and 10) are mounted on the shaft 11 for wrapping the flexible elements 18, 19 and 21 in accordance with movements of the shaft 11.

The winding spool 54 is formed of a sleeve having annular flanges 56, at the ends thereof and spaced to confine and guide the flexible elements 19. The periphery of the spool 54 is substantially cylindrical and a portion thereof is cut away as at 57 (Fig. 8). An anchor plate 58, which replaces a portion of the cut away peripheral surface of the spool 54 and is anchored in suitable apertures in the flanges 56 at the ends of the spool (Fig. 10) and is spaced from the body thereof to form a slot 59, provides a means for attaching the flexible element 19 to the spool 54. The flexible element is attached to the spool 54 by inserting an end thereof through the slot 59 and wrapping the flexible element back over the anchor plate 58 and the free end thereof which effects a binding or frictional engagement of the flexible element between the periphery of the spool 54 and the outer wrapping and in proportion to the applied load.

The winding spools 55 are like the spools 54 with respect to the above mentioned features and include similar annular flanges 61, and other annular flanges 62, spaced therefrom to form an annular channel 63, for receiving and locating the detachable guide frame 22, as will be later described.

The spools 54 and 55 may be bored to rotate freely upon the round sections 31 of the shafts 11 and 12 and suitably notched to receive protuberant portions on said shafts and in the present embodiment I have shown (Figs. 7 and 8), the bore or interior of the spools 54 and 55 formed to conform to the rectangular portions 32 of the shafts 11 and 12. It will be noted that certain round portions 31 of the shafts 11 and 12 are longer than either one of the spools 54 or 55, and that these spools may be successively shifted axially along the shafts to the position indicated in dotted lines (Fig. 7) or over a round portion thereof and that when a spool is in this position it may be rotated freely about the shaft. In this position the flexible elements are attached to the spools and wound thereon in accordance with requirements after which the spool is shifted onto an angular portion 32 and thereby connected to rotate with the shaft.

The flexible elements 21 are used only when the vault 26 is suspended at or near the bottom of the grave excavation 13 and for lifting the cover 27 from carrier devices 64, and lowering the cover onto the vault as illustrated (Figs. 1 and 2). In order to facilitate this operation and to guide the cover 27 the guide frames 22 (Fig. 18) are provided. These guide frames are formed of side frames 65 and 66, of inverted U shape suitably secured together by means of spacers 67, and having bifurcated ends 68 which are engaged in the annular channels 63 of the spools 55 for supporting the frames 22 thereon as shown. When the frames 22 are used the flexible elements 18 are disconnected from the spools 55 and temporarily attached to the corner supports or pedestals 15 and 16 (as shown Fig. 2) for the purpose of loading the frame 14. A flexible element 21 is connected to and wound on each spool 55, and is laced over an idler roller 71 rotatably mounted in the frame 22, then over a guide roller 72 similarly mounted in the frame 22 and is then connected to a handle 73 on the cover 27 by means of a hook device 74 which is attached to the belt 21 as indicated (Fig. 19). The guide rollers 72 are preferably arranged in the frames 22 in accordance with the arrangement of the handles 73 on the vault covers to be handled.

The carrier devices 64 and tracks 75 therefor illustrated (Figs. 1, 2 and 5) may be of any suitable type and are preferably of the type shown and described in my copending application Serial Number 710,138, filed February 7, 1934, for Burial apparatus, now Letters Patent No. 2,112,286, dated March 29, 1938.

To provide a temporary support means for initially receiving and supporting a casket to be deposited or entered into the burial vault 26 and transferring the casket to the flexible lowering elements 19 I have shown the temporary support arms 23 (Figs. 1 to 5 and 11 to 14, inclusive). These arms 23 each include a frame 81, having perpendicularly disposed bearing lugs 82, formed thereon to form bearings for an anti-friction roller 83, of cylindrical form and formed of a composition containing rubber which is rotatably mounted on a shaft 84 mounted in the lugs 82, and a bearing ring 85 formed at one end of the frame 81 and having cam lugs 86 and 87, extending laterally therefrom. The arms 23 are preferably formed as left and right arms as illustrated and accordingly the lugs 86 and 87, may be arranged to extend from one side of the ring 85 as shown in solid lines (Fig. 12) or from the other side thereof as shown in dotted lines. An adjusting screw 88, may be mounted in the lug 86 to provide vernier adjustment of the operating position of the arm 23.

The bearing or mounting sleeve 24 is provided to adjustably and interlockingly attach the arms 23 to the shafts 11 and 12. The sleeves 24 are internally formed in accordance with the bore in the spools 54 and 55 and for axial movement along either the shaft 11 or the shaft 12 and onto or off of the angular portions thereof so that they may be shifted onto a round portion for adjustment and then back onto the angular portion to effect a rotating connection with the shaft. The exterior of the sleeves 24 is of substantially cylindrical form and may be of greater length than twice the width of the bearing ring 85 so that an annular bearing surface 91, substantially equal in width to the width of the ring 85 and of a diameter substantially equal to the opening in the ring, and a similar annular channel 92, which is equal in width to the width of the ring 85 and of less diameter than the opening therein and set apart from the bearing surface 91 by a tapered shoulder 93 may be provided. An annular flange 94, forms the limit of the channel 92, and a similar flange 95, forms the limit of the bearing surface 91.

Lugs 96 and 97, are formed integral with one end of the sleeve 24 having sockets 98, therein for receiving the cam lugs 86 and 87 of the arm ring 85. These lugs are preferably arranged ninety degrees apart and have at least one surface portion 99, which is disposed substantially at right angles to the flange 95 for engagement by the lugs 86 or 87 to provide a one way drive connection between the arm 23 and the sleeve 24, and another surface portion 101 which is angularly disposed with respect to the surface 99 and cooperates with a correspondingly angular surface 102 formed on the lugs 86 and 87 to form a wedge cam which functions to shift the ring 85 and arm 23 to the right (Fig. 13) along the sleeve 24 and into the channel 92 as shown (Fig. 14) upon predetermined relative movement of the arm 23 and sleeve 24. The shoulder 93 on the sleeve 24 increases this movement to the extent that the lugs 86 and 87 are moved free or away from the sockets 98 and also prevents return movement of the ring 85 and lugs 86 and 87 such as may occur while the sleeve 24 is rotating in the ring 85. The lugs 86 and 87 are engaged in the sockets 98 by manually shifting the ring 85 and engaging the lugs therein. A set screw 103 may be mounted in the sleeve 24 for locking the sleeve in adjusted relationship on the lowering shaft.

To provide means for centering a burial vault 26 with respect to the frame 14 and the rotating lowering shafts and temporary support arms 23, locating rollers 104, are rotatably mounted on bosses 105, extending from the corner supports or pedestals 15 and 16, to engage the corners of the vault as indicated (Fig. 15, and by means of shoulder screws 108 having threaded engagement in the bosses 105 (Fig. 16).

Means is also provided for indicating the position of the burial vault located by the centering means with respect to the temporary support devices 23 so that when a casket is arranged thereon in accordance with the indicating means the casket is registered with the vault and will not strike the sides of the vault to interrupt movement of the casket into the vault and in the present embodiment a bead 107, formed on the periphery of the roller 83 of each one of the arms 23 and having the effect of a guide roller cooperating therewith forms the indicator.

It is obvious that the ground level adjacent the opening of a grave excavation is not always level and since it is preferable to arrange the temporary support arms 23 to support the casket level, means is provided to accomplish this and in the present embodiment I have shown a plurality of threaded screws 108, (Figs. 1 to 6 inclusive, and 17) arranged for connection to the corner supports 15 and 16 and to form legs therefor. Each one of the screws 108 is provided with a foot piece 109, having a swivel connection with one end thereof and an adjusting nut 111.

Sockets 113 and 114, are formed integral with or in the corner support pedestals 15 and 16 for receiving an end 115 of the screws 108. These sockets are preferably a straight bore in the pedestals of a diameter only slightly larger than that of the screws 108 so that the screws or legs will be held relatively rigid while permitting the end 115 to be manually inserted into the bore to the extent permitted by the nut 111.

It will be noted that two sockets are or may be provided in each pedestal and that the screws 108 may be assembled in either socket in accordance with requirements and to avoid obstructions such as a stone marker 116 shown in solid lines (Fig. 4) or a headstone 117 shown in dotted lines therein.

The rotatable lowering shafts 11 and 12 are rotated coordinately to effect operation of the above mentioned apparatus and to accomplish this a worm 121, is mounted on a drive shaft 122, journaled in bearings 123 and 124, formed in each one of the pedestals 16, adjacent the worm gear 42 and so that the worm will operably engage the gear 42. A keyed or rectangularly formed end 125, of the shaft 122 extends from the pedestal 16 to be engaged by a driving means such as a suitable hand crank or the power unit 25. Another end of the shaft 122 extends through the bearing 124 and from the pedestal 16 and a universal coupling 126, is suitably secured thereto.

An extensible connecting shaft 127, including shaft parts 128, of rectangular form connected to and extending from the coupling 126, of each one of the pedestals 16, and tube parts 129, adapted to fit freely over the parts 128 and having annular flanges 131, at an end thereof, forms an extensible and an adjustable drive connection between left and right-hand pedestals 16. Aligned apertures 132, are formed in the flanges 131 and a latch pin 133, extended through two aligned apertures in the abutting flanges 132, latches the two parts of the shaft 127 and consequently the rotatable shafts 11 and 12 in adjusted relationship and for coordinated rotation.

The power unit 25, illustrated is described and claimed in my copending application Serial Number 105,062, and may be any suitable mechanism which may be connected to drive the shaft 127, such as a case 141, containing motors or the like, which may be attached to the keyed end 125 of a shaft 122 through a coupling device 142, and which may be supported in any suitable manner or attached to the pedestals 16 through a bracket 143, attached to the case 141, and a cooperating fixture 144 extending from the pedestals 16 as indicated.

The device is assembled over a grave excavation on planks 145 and 146 arranged in parallel along the long sides of the opening and while the vault is positioned above these planks on suitable cross supports. The legs or screws 108 are inserted in the pedestals 15 and 16 and roughly adjusted by means of the nuts 111, the rotatable shafts 11 and 12 are then connected between pairs of pedestals 15 and 16 or on both sides and the spacing connectors 17 are assembled with a spacing tube 46 of suitable length and by inserting the aligning bar 45 through the tubes 44 and 46 from an outside end. The extensible shaft 127 may then be connected by means of the pin 133 and the screws 108 may be adjusted to level the rotatable shafts 11 and 12.

The sleeves 24 and arms 23, being assembled to the shafts 11 and 12 prior to their assembly in the frame 14, may now be adjusted in accordance with the relative assembled positions of the shafts 11 and 12 or to common casket receiving positions which may be accomplished by shifting the sleeves 24 and in part by adjusting the screws 88. After the arms 23 on the shafts 11 or 12 are adjusted to a common or suitable level and the arms 23 on the other shaft are similarly adjusted it may be found that they do not coincide and they may then be adjusted to coincide by adjusting the shafts 11 and 12 through the apertured flanges 132 and pin 133.

The flexible elements 18, and 19 are then attached as above described and the plates 49, and motor unit 25 may be attached to complete the assembly.

Tracks 75 and cover carrier devices may also be assembled to assist in the removal of the cover 27 as above described, and anti-friction rollers 147 mounted on plates 148 may be attached to the planks 145 and 146 to protect the planks and the flexible elements 18.

The flexible elements 18 are wound on the spools 55 mounted on the shaft 11 in a clockwise direction (Fig. 6) and in a counter-clockwise direction on the spools 55 mounted on the shaft 12 and the flexible elements 19 are oppositely wound on the spools 54 or counter-clockwise on the shaft 11 and clockwise on the shaft 12, therefore a load applied to the flexible elements 19 is counter-balanced over the shafts 11 and 12 by the load on the flexible elements 18. Similarly the load applied to the arms 23 tends to rotate the shafts 11 and 12 in opposition to the flexible elements 18 or to wind them up which tendency is counter-balanced by the load applied to these elements. By arranging the flexible elements in this manner the power required to rotate the shafts 11 and 12 is reduced under maximum load conditions.

When a casket 28 is positioned on the temporary support arms 23 (Fig. 5), mild pressure on a run button 151, of the power unit 25 causes the shaft 11 to rotate clockwise and the shaft 12 to rotate counter-clockwise thus raising the vault and lowering the casket onto the flexible elements 19 and continued pressure thereon lowers the casket into the vault when the elements 19 may be disengaged from the spools 54 and removed. The cover 27 may be positioned over and applied to the vault by continued pressure on the button 151 after which the entire assembly is lowered by pressure on a run button 152 of the power unit or the cover may be lowered to the vault at the bottom of the excavation by the application of the guide frame 22 and flexible elements 21 as above described.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. The combination with a vault lowering device comprising rotatable lowering elements and flexible elements extending therefrom for supporting and moving the vault, of other flexible elements extending from said rotatable lowering elements and connected for control thereby whereby a casket may be lowered to the floor of the vault as an incident to operation of the rotatable elements.

2. The combination with a vault lowering device comprising rotatable lowering elements and flexible elements extending therefrom for supporting and moving the vault, of other flexible elements extending from said rotatable lowering elements and connected for control thereby whereby a casket may be supported in counter-balanced relationship with respect to the vault and lowered to the floor of the vault by operation of said rotatable elements.

3. The combination with a vault lowering device comprising rotatable lowering elements and flexible elements extending therefrom for supporting and moving the vault, of relatively rigid members carried by said rotatable lowering elements for initially receiving and supporting a casket over the vault, and other flexible elements extending from said rotatable lowering elements and connected for control thereby whereby the casket may be received and lowered to the floor of the vault by operation of said rotatable elements.

4. The combination with a vault lowering device comprising rotatable lowering elements and flexible elements wrapped about and extending therefrom for supporting and moving the vault, of other flexible elements wrapped about said lowering elements in opposed relationship and extending therefrom to receive and move a casket whereby the casket may be supported in counterbalanced relationship with respect to the vault and lowered to the floor of the vault as an incident to movement of the lowering elements.

5. The combination with a vault lowering device comprising rotatable lowering elements for effecting operation, of laterally extending temporary support arms mounted for control thereby, and flexible elements for supporting and moving the vault connected to said rotatable lowering elements in opposed relationship and for opposite control thereby whereby a load applied to the temporary support arms is counterbalanced by the vault through said flexible elements.

6. The combination with a vault lowering device comprising spaced rotatable lowering elements connected for effecting operation of temporary support arms extending laterally therefrom for supporting a casket in position to be deposited into a vault, flexible elements connected to and extending between said rotatable elements whereby the casket is lowered into the vault as an incident to operation of said rotatable elements, and other flexible elements for supporting and moving the vault connected to said rotatable lowering elements in opposed relationship and for opposite control thereby whereby loads applied to said temporary support arms and to said first mentioned flexible elements are counterbalanced by the vault.

7. The combination with a vault lowering mechanism whereby a burial vault may be suspended and adjusted vertically in a grave excavation including spaced rotatable elements and flexible elements connected thereto and arranged to extend across the grave excavation under the vault for supporting the vault therein, of other flexible elements arranged to extend across the grave excavation above the vault for receiving a casket to be deposited into the vault and being connected to said rotatable elements to support the casket in counterbalanced relationship with respect to the vault while relative movement of the casket and the vault is controlled by said rotatable elements.

8. A burial mechanism comprising, means for lowering a burial vault into a grave excavation including spaced rotatable elements and flexible lowering elements having detachable connections therewith, counterbalanced means for lowering a casket into said burial vault including successively operable flexible elements having a detachable connection with said rotatable elements, and means for lowering a vault cover to said burial vault after the casket is deposited therein including other flexible elements having a detachable connection with said rotatable elements and being successively operable thereby.

9. A burial mechanism comprising, means for lowering a burial vault into a grave excavation including spaced rotatable elements and flexible lowering elements having detachable connections therewith, means controlled by said rotatable elements for depositing a casket into said burial vault, means for adapting said rotatable elements for lowering a vault cover to said burial vault after the casket is deposited therein in response to operation of said lowering elements including other flexible elements having a detachable connection with said vault cover and a similar connection with the rotatable elements, and a guide frame constructed and arranged for registered support on said rotatable elements and to co-operate therewith to direct movement of the vault cover.

10. A burial mechanism comprising, means for lowering a burial vault into a grave excavation including spaced rotatable elements and flexible lowering elements having detachable connections therewith, means controlled by said rotatable elements for depositing a casket into said burial vault, means for adapting said rotatable elements for lowering a vault cover to said burial vault after the casket is deposited therein in response to operation of said lowering elements including other flexible elements having a detachable connection with said vault cover and a similar connection with the rotatable elements, and a guide frame constructed and arranged for registered temporary support upon said rotatable elements and carrying guide rollers for directing the movement of the vault cover by controlling the flexible elements.

11. The combination with a lowering device of the character described, of a rotatable shaft lowering device having axially spaced and peripherally disposed protuberant portions, a flexible lowering element, and a winding spool for said flexible element mounted to rotate freely on said rotatable shaft when positioned between the axially spaced protuberant portions thereon and being cored to receive said protuberant portions, said winding spool being axially shiftable into driving engagement with at least one of the axially spaced protuberant portions on said rotatable shaft whereby said flexible element is connected for adjustment by means of the rotatable shaft.

12. The combination with a lowering device of the character described, of a rotatable shaft lowering device having axially spaced and peripherally disposed protuberant portions, a temporary support device, and a connecting sleeve for supporting the temporary support device on said rotatable shaft mounted for axial movement thereon and being formed to engage a protuberant portion thereof whereby the temporary support device is interlockingly connected for rigid support on said rotatable shaft.

13. The combination with a lowering device of the character described, of rotatable shaft lowering devices having axially spaced and peripherally disposed protuberant portions, flexible lowering elements, and winding spools for said flexible elements of less length than the axial distance between and internally formed to engage with the protuberant portions of said rotatable shaft and being mounted for axial movement on said rotatable shafts from a position between protuberant portions thereof wherein rotary adjustment of the spools is facilitated to a position wherein the spool is interlocked with a protuberant portion of the shaft for rotation therewith for the purpose described.

14. The combination with a lowering device of the character described, of rotatable shaft lowering devices having axially spaced and peripherally disposed protuberant portions, a plurality of sleeve devices arranged on said rotatable shafts and being formed to receive the protuberant portions thereof, said sleeve devices being shiftable axially thereon into and out of driving engagement with the protuberant portions thereof, and flexible lowering elements connected with said rotatable shafts through said sleeve devices.

15. The combination with a lowering device of the character described, of rotatable shaft lowering devices having axially spaced and peripherally disposed protuberant portions, a plurality of sleeve devices arranged on said rotatable shafts and being shiftable axially thereon into and out of engagement with the protuberant portions thereof, temporary support devices mounted on said sleeve devices and for limited connection with the rotatable shafts, and flexible lowering elements adapted to receive a casket from said temporary support devices and lower the casket, said flexible elements being similarly connected to the rotatable shafts for control thereby.

16. The combination with a lowering device of the character described comprising rotatable lowering elements and flexible elements connected thereto for lowering a casket, of a sleeve having an adjustable interlocking connection with a rotatable lowering element, and a temporary support arm carried by said sleeve and having a one way drive connection therewith whereby the casket is received and transferred to the flexible elements.

17. The combination with a lowering device of the character described, comprising a rotatable shaft lowering device, of a temporary support arm, and means for connecting said arm for support on and predetermined control by said rotatable shaft, said means including a sleeve having a shiftable connection with the rotatable shaft and a one-way drive connection with said arm.

18. The combination with a lowering device of the character described, ocmprising a rotatable shaft lowering device, of a temporary support arm, and means for connecting said arm for support on and predetermined control by said rotatable shaft, said means including a sleeve removably mounted on and constructed to interlock with said rotatable shaft in either one of a plurality of positions and carrying said arm.

19. The combination with a lowering device of the character described, comprising a rotatable shaft lowering device, of a temporary support arm, and means for connecting said arm for support on and predetermined control by said rotatable shaft, said means including a cam lug formed on said arm, and a sleeve having a shiftable connection with said rotatable shaft and a socket for receiving the cam lug on said arm whereby the arm is connected to rotate with said rotatable shaft in one direction.

20. The combination with a lowering device comprising, a rotatable shaft lowering device, of a temporary support arm having a bearing ring formed at an end thereof and at least one lug device, and a connecting sleeve arranged in the bearing ring of said arm and having a one way drive connection with the lug device thereof, said sleeve being mounted on and having a shiftable connection with said rotatable shaft.

21. The combination with a lowering device, comprising a rotatable shaft lowering device, of a bearing sleeve removably mounted on said rotatable shaft and having a shiftable connection therewith providing adjustment of the sleeve about said shaft, and a temporary support arm mounted on said sleeve and having an adjustable one way drive connection therewith.

22. The combination with a lowering device, comprising a rotatable shaft lowering device, of a bearing sleeve mounted on said rotatable shaft and having a shiftable connection therewith providing adjustment of the sleeve about said shaft, a temporary support arm mounted on said sleeve and for axial movement thereon and having a drive connection with said sleeve in one position and being freely rotatable thereon in another position, and shifting means operable upon predetermined relative movement of said arm and said sleeve for shifting the arm from one position to the other position.

23. The combination with a lowering device, comprising spaced rotatable lowering shafts, and temporary support arms carried thereby, of drive means for said lowering shafts including a two part drive shaft extending between and operably connected to actuate said lowering shafts and connected together through an adjustable connection whereby the relative elevated positions of said temporary support arms may be adjusted.

24. The combination with a lowering device, comprising spaced rotatable lowering shafts, of temporary support arms adjustably connected to said rotatable lowering shafts, and an interconnected drive means for said rotatable shafts including an adjustable transmission device forming an intermediate part of the drive means whereby the relative positions of said temporary support arms may be adjusted.

25. The combination with a lowering device, comprising spaced rotatable lowering shafts, and parts cooperating therewith to form a rectangular frame adapted to be positioned over a grave excavation for the purpose described and including corner pedestals, of screw devices engaging in the corner pedestals of said frame for leveling the frame, at least one of said screw devices comprising a threaded screw having a swivel cap secured thereto and forming a foot, and an adjusting nut having threaded engagement with said screw and being adjustable along said screw toward and away from the foot thereof for supporting and determining the level of a portion of said frame.

26. The combination with a lowering device, comprising spaced rotatable lowering shafts, and parts cooperating therewith to form a rectangular frame adapted to be positioned over a grave excavation for the purpose described and including corner pedestals, of adjustable temporary support arms carried by said rotatable shafts for receiving and supporting a casket, and means engaging the pedestals of said frame whereby the level of said temporary support arms may be adjusted to form a level support for the casket independent of the relative position of said frame.

27. The combination with a lowering device, comprising spaced rotatable lowering shafts, and parts cooperating therewith to form a rectangular frame adapted to be positioned over a grave excavation for the purpose described and including corner pedestals, of adjustable temporary support arms carried by said rotatable shafts for receiving and supporting a casket and adjustably connected thereto, means for adjusting the temporary support arms through said rotatable shafts, and means engaging the pedestals whereby the level of said rotatable shafts and the temporary support arms carried thereby may be adjusted to form a level support for the casket.

28. The combination with a lowering device, comprising spaced rotatable lowering shafts, and parts cooperating therewith to form a rectangular frame adapted to be positioned over a grave excavation for the purpose described and including corner pedestals, of adjustable temporary support arms carried by said rotatable shafts for receiving and supporting a casket, and means engaging the pedestals of said frame whereby the level of said temporary support arms may be adjusted to form a level support for the casket independent of the relative position of said frame, said means comprising detachably connected screw devices constructed and arranged to form legs for said pedestals.

29. The combination with a lowering device of the character described, comprising a rotatable lowering element and means cooperating therewith for lowering a casket to a predetermined position, of a temporary support arm coordinated therewith for receiving and delivering a casket to said casket lowering means including a frame operably connected to said lowering shaft and carrying an antifriction roller and an indicator for indicating a position for the casket on said temporary support arm wherein the casket may be positioned so that it may be lowered to the predetermined position by operation of the rotatable lowering element.

30. The combination with a lowering device of the character described, comprising spaced rotatable lowering shafts, flexible vault lowering elements arranged to carry a vault and being connected to said lowering shafts, and devices cooperating therewith to form a rectangular frame adapted to be arranged over a grave excavation and including corner supports, of rollers mounted on said corner supports and arranged to center a vault suspended on the flexible lowering elements with respect to said rotatable lowering shafts.

31. The combination with a lowering device of the character described, comprising spaced rotatable lowering shafts, flexible vault lowering elements arranged to carry a vault and being connected to said lowering shafts, temporary support devices mounted thereon, and devices cooperating therewith to form a rectangular frame adapted to support said lowering shafts and to be arranged over a grave excavation and including corner supports, of centering devices mounted on said corner supports and arranged to center a vault suspended on the flexible lowering elements with respect to said rotatable lowering shafts, and indicators carried by said temporary support devices for indicating alignment of a casket carried thereby with a vault located by said centering devices whereby a casket positioned on the temporary support devices in accordance with said indicators may be entered into a vault carried by said flexible elements by operation of said rotatable lowering shafts.

32. The combination with a lowering device of the character described comprising spaced rotatable shafts arranged to form a lowering device and flexible elements for supporting a load between and from said rotatable shafts for movement thereby, of adjustable means for connecting said flexible elements to said rotatable shafts including winding spools mounted on said shafts, at least one of which is axially shiftable into and out of interlocking engagement with the shaft to permit of adjustment of the flexible element prior to the application of the load.

33. The combination with a lowering device of the character described comprising spaced rotatable shafts arranged to form a lowering device and having axially spaced sections of alternately cylindrical and rectangular form, and flexible elements for supporting a load between and from said rotatable shafts for movement thereby, of adjustable means for connecting said flexible elements to said rotatable shafts including winding spools mounted on said shafts, at least one of which is shorter in length than one of the cylindrical sections of its shaft and provided with a rectangular bore for receiving a rectangular portion of the shaft to permit axial shifting of the spool along the shaft and into and out of interlocked engagement therewith whereby the flexible element may be adjusted in accordance with operating requirements.

34. The combination with a lowering device of the character described comprising spaced rotatable shafts arranged to form a lowering device and having axially spaced sections of alternately cylindrical and rectangular form, and flexible elements for supporting a load between and from said rotatable shafts for movement thereby, of adjustable means for connecting said flexible elements to said rotatable shafts including winding spools mounted on said shafts and having rectangular openings therein proportioned to fit the cylindrical sections of said shafts for free rotation thereon and to fit the rectangular portions thereof for driving engagement therewith, said spools being axially shiftable along said shafts to facilitate adjustment of the flexible elements or to establish a driving connection in accordance with requirements.

WILBERT W. HAASE.